Dec. 12, 1933.                B. McCLELLAND                1,939,509
                                GAUGE BAFFLE
                              Filed May 4, 1929
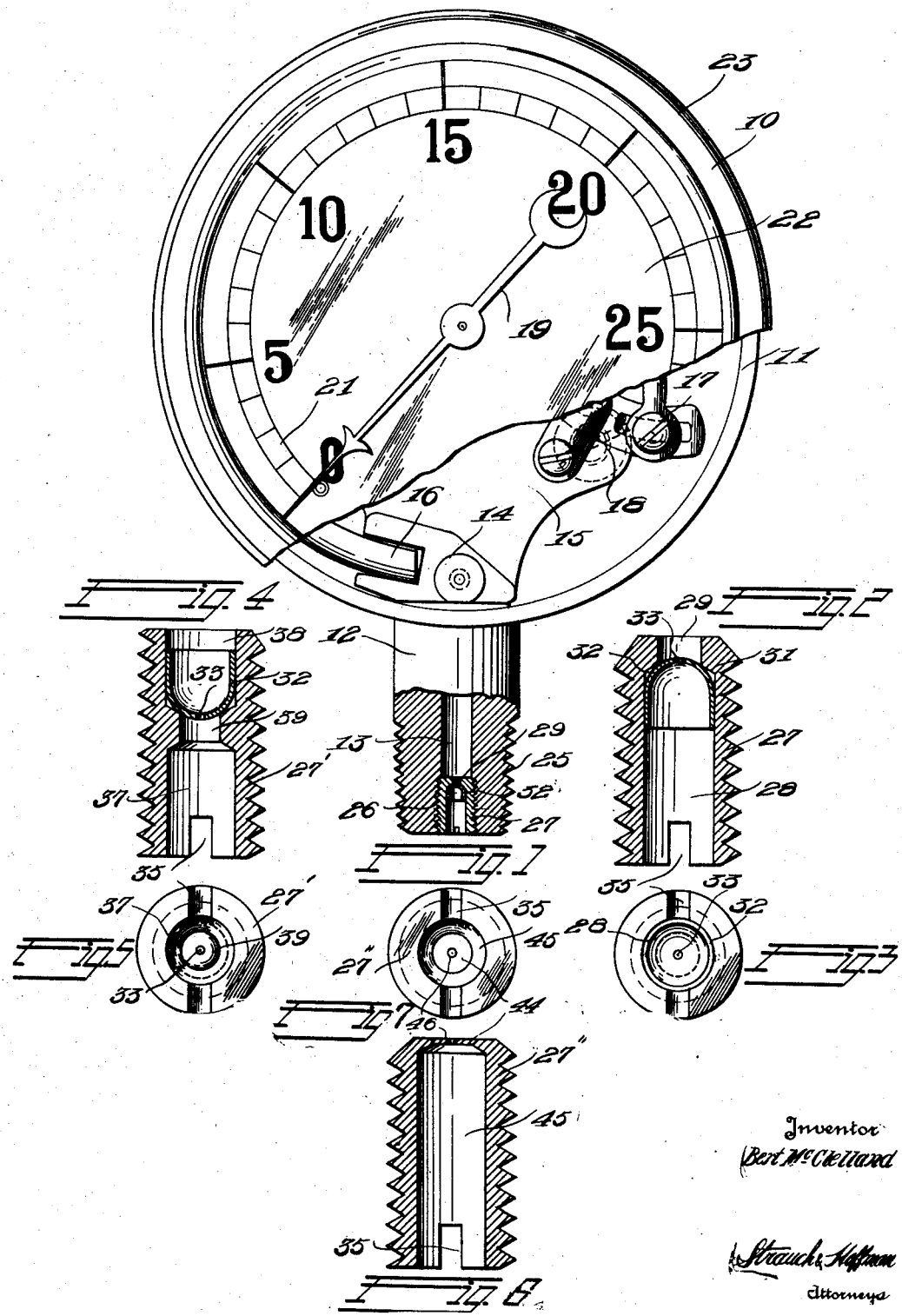

Patented Dec. 12, 1933

1,939,509

UNITED STATES PATENT OFFICE 1,939,509

GAUGE BAFFLE

Bert McClelland, Perkasie, Pa., assignor to United States Gauge Company, Sellersville, Pa., a corporation of Pennsylvania Application May 4, 1929. Serial No. 360,541

4 Claims. (Cl. 73—31)

The present invention relates to a new and improved baffle for pressure indicating gauges.

More specifically, the invention relates to a baffle plug for gauges, used on pumping systems and so forth, for substantially damping the vibrations or pulsations in the systems, thus avoiding to a substantial degree the transmission of such vibrations or pulsations to the indicating pointer of the gauge to cause its fluctuation.

As is well known, pressures developed in various systems, such as pumping systems, for example, are subject to substantial irregularity which if transmitted directly to the gauge indicating pointer would cause a rapid vibration of the pointer thus making reading of the gauge difficult. Furthermore sudden changes in pressure, if transmitted directly to the indicating pointer through the mechanism associated with the pointer has a destructive effect on the gauge and impairs its efficiency.

The undesirability of transmitting the pressures in pumping systems and so forth directly to the gauge indicating mechanism has long been recognized. Gauges heretofore used have been provided with somewhat restricted passages leading to the gauge for damping or checking vibrations or pulsations in the system and thus preventing substantial vibrations of the indicating pointer. Such constructions have not been found to be entirely successful.

In order to really effectively check or damp the pressure pulsations in a pumping system and thus avoid the direct transmission thereof to the indicating mechanism, it is necessary that a passage be provided of very small diameter. Such passages have a tendency to readily clog. Most gauges heretofore constructed have included relatively long bores or passages and successful operation could not be obtained with a passage of very small diameter for the reason that a bore of substantial length and relatively small diameter would be very liable to periodically clog, thus requiring frequent disassembly of the gauge and cleaning thereof. To avoid this, the passages have been constructed of a very much greater diameter than was desirable for really effective operation.

Gauges, heretofore constructed, utilizing restricted passages to damp out impulses or abrupt pressure changes in a system, have not met the requirements of a satisfactory operation and low initial cost due to the fact that the parts, in which the passages were formed, were not readily removable for facilitating cleaning and were unnecessarily complicated in construction and in method of assembly.

I have found that highly satisfactory results can be secured, if an extremely small passage is provided in the baffle for the gauge, and that such a passage will not readily clog if the length thereof in the direction of flow is extremely short and, particularly if the length does not greatly exceed the diameter of the passage. Such passages remain clear, because particles tending to clog them can not become wedged therein because of the absence of a surrounding wall of substantial area with which such particles can contact.

A primary object of the present invention accordingly is to provide a thoroughly effective baffle between a pressure source and a pressure indicator for substantially preventing vibration of the pointer of the indicator upon sudden variations of pressure in said pressure source.

A still further object of the invention is to provide pressure pulsation damping means disposed between a pressure source and a pressure indicator, so that it may be very readily removed for cleaning purposes, said damping means being of little tendency to clog.

A still further object of the invention is to provide a removable baffle plug for pressure gauges, said baffle plug provided with a restricted bore of very small diameter and very short length, whereby said bore substantially prevents the transmission of pressure pulsations to the gauge pointer with little attendant danger of clogging of said bore.

With these objects in view as well as others that will become apparent in the course of the following disclosure reference will be had to the accompanying drawing forming part thereof and in which:

Figure 1 is a front elevational view of a pressure gauge of the Bourdon type partly broken away and partly in section disclosing the association therewith of a baffle construction constituting one of the embodiments of my invention, the baffle being shown of exaggerated thickness and the passage of exaggerated width.

Figure 2 is a vertical longitudinal sectional view of the baffle plug construction disclosed in Figure 1.

Figure 3 is a bottom plan view of the construction illustrated in Figure 2.

Figure 4 is a view similar to Figure 2 illustrating a modified form of baffle plug.

Figure 5 is a bottom plan view of the construction illustrated in Figure 4.

Figure 6 is a vertical longitudinal sectional view through a further modified form of baffle in the form of a removable plug, similar to that shown in Figure 1.

Figure 7 is a bottom plan view of the construction illustrated in Figure 6.

Referring to the drawing, in which like characters designate like parts, and referring first to Figures 1, 2 and 3, 10 designates a gauge which may be of any well known construction generally comprising a casing 11 through which projects the gauge socket 12 provided with a bore 13 communicating at the inner end thereof, through member 14 comprising a part of mechanism supporting frame 15, with the fixed end of a Bourdon tube 16 whose opposite free end is adjustably connected at 17 to the operating mechanism 18 for imparting rotation to the pointer 19 which pointer moves over a graduated scale 21 on a dial, enclosed by a crystal 22, which is secured to casing 11 by means of a ring 23. The inner end of socket 12 is externally threaded as at 25 in usual manner for detachable connection through a suitable union with a conduit leading from a pressure source.

The outer end of bore 13 is slightly enlarged and threaded as indicated at 26 for the detachable reception of an externally threaded baffle plug 27, indicated on a larger scale in Figures 2 and 3. The baffle plug 27 is provided centrally thereof with a substantially large bore 28 which opens through the bottom or outer end of plug 27, and communicates with a substantially short bore 29 of less diameter than bore 28 and opening through the upper or inner end of plug 27. Bores 28 and 29 at the junction thereof provide a conical shaped shoulder 31 against which is seated the hemispherical end of a sheet metal cup 32, whose skirt portion accurately engages the wall of bore 28, as indicated in Figure 2. The cup is secured in position by any suitable means, as by soldering, welding or otherwise. Said cup 32 is constructed of brass, Monel metal or any other suitable material and is of a very thin gage approximately .005 of an inch. Said cup centrally of the bottom thereof is provided with a hole 33 providing communication between bores 28 and 29, and said hole is of a very small diameter preferably .005 of an inch. The dimensions of the thickness of the cup as well as the diameter of the hole may of course, be changed to suit varying circumstances and the nature of the fluid under pressure. It is important, however, that the hole be as small as permissible under the circumstances, and that the length of the passage thus formed be not substantially greater than the diameter of the hole. Plug 27 is provided with a slot 35 in the outer end thereof for reception of a screw driver or other suitable instrument, whereby plug 27 can be readily mounted in or removed from socket 12 to clean it of any collection of foreign substances that may accumulate in the cup or plug.

In operation, the gauge 10 with the plug 27 removably secured therein as indicated in Figure 1 is detachably connected with a pumping system or other pressure source in well known manner. The pressure is transmitted from the pumping system through a conduit or other suitable means detachably connected with socket 12 and thence through bores 28, 33 and 29 in plug 27 and through bore 13 in socket 12 into tube 16 which tube, as is well understood, contracts or expands consequent to reduced or increased pressures, which pressures are indicated by pointer 19. By the provision of the relatively small hole 33 in the relatively thin wall of cup 32 the vibrations or pulsations resulting from fluctuations in the pumping system are substantially checked and thus are not transmitted from bore 28 to bore 29 as a result of which pointer 19 will not be subjected to vibration. By the provision of the relatively thin wall of cup 32, hole 33 is not likely to become clogged and thus render the gauge inoperative because particles can not wedge themselves in the passage formed by said hole. By the provision of the removable plug 27, said plug can be readily cleaned of collected material upon disconnection of gauge 10 and removal of plug 27, by means of a screw driver engaging slot 35 therein.

In Figures 4 and 5 is disclosed a modified form of baffle plug 27' which externally conforms to plug 27 and is externally threaded for detachable connection in socket 12 of gauge 10. Plug 27' is provided in the lower or outer end thereof with a bore 37 and in the upper or inner end thereof with a bore 38, bores 37 and 38 terminating in slightly spaced relation adjacent the center of plug 27' and intercommunicating through a smaller co-axial bore 39.

Disposed in bore 38 and suitably secured therein is a thin metallic cup 32 provided with a small hole 33 in the hemispherical end thereof in the same manner as in the similar cup 32 in plug 27. In this form of the invention the closed hemispherical end of cup 32 faces toward the lower or outer end of plug 27' with hole 33 communicating directly with bore 39. Plug 27' is provided with a slot 35 for receiving a screw driver or any other suitable instrument for turning plug 27' into or out of screw-threaded engagement with threaded section 26 of bore 13.

In operation, this form of baffle plug will function in the same manner as plug 27.

In Figures 6 and 7 is disclosed a still further modified form of the invention wherein the thin metallic cup of Figure 2 is replaced by a correspondingly thin wall 44 forming a substantially complete closure for the upper or inner end of a bore 45 in plug 27'', the plug being externally threaded similar to plugs 27 and 27' as indicated and provided with a tool engaging slot 35. Wall 44 is provided with a relatively small hole 46 similar to and functioning in the same manner as hole 33. While I have disclosed several embodiments of my invention comprising in general a very small and short passage or opening for interposition between a pressure source and a pressure indicating device, this invention is not restricted to said embodiments. Thus in accordance with my present invention a relatively simple and inexpensive pressure damping means is provided which due to its construction is not subject to ready clogging, and which can be very easily removed in the event of the accumulation of foreign matter due to the restriction but not actually in the restricted passage.

For most effective operation of the damping means, as above pointed out, it is highly important that a very small hole or opening (about .005 inch) be provided for effectively checking or damping pressure pulsations, and it is equally important that the length of the opening be very short (preferably about .005 of an inch), so that the wall surrounding the opening is practically only a blunt knife edge. Thus any dirt particles small enough to pass into the opening will have little tendency to become wedged in or stick within the opening. The diameter of the opening need not necessarily be equal to the thickness of the wall but these factors should be substantially the same.

While I have disclosed my improved pressure damping means in relation with a known type of Bourdon pressure gauge, it is to be understood that the damping means in the various modifications disclosed are equally applicable to any form of pressure gauge or indicator provided with any form of pressure source connections.

The damping means disclosed are especially well adapted to pressure gauges in pumping systems and will function efficiently in connection with air lines alone or in such lines in which their is a small amount of oil. The device also is thoroughly effective when used in systems including air mixed with water, as well as with lines containing water alone, as in car washing systems for example.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range or equivalency of the claims are therefore intended to be embraced therein.

What I claim and desire to secure by United States Letters Patent is:

1. In combination with a pressure indicating device comprising a socket member for detachable connection with a pressure source, of a pressure fluctuation baffle member removably associated with said socket member; said baffle member comprising an externally threaded plug for detachable threaded engagement within said socket member; said plug provided with a bore; and a pressure fluctuation damping means in said bore comprising a baffle wall of a thickness approximating 0.005 inches provided with a passage of a width approximating 0.005 inches.

2. The combination defined in claim 1 in which said baffle wall comprises a very thin wall integral with said plug, the diameter of said passage approximating the thickness of said wall.

3. The combination defined in claim 1 in which said central bore is reduced for a portion of its length defining a shoulder and in which said damping means comprises a thin walled cup member having said passage in the closed end thereof with the periphery of said cup in frictional sealing contact with the inner wall of said plug and said closed end in engagement with said shoulder.

4. The combination defined in claim 1 in which said bore is reduced intermediate the ends of said plug defining a pair of shoulders and in which said damping means comprises a thin walled cup means havings said passage in the closed end thereof with said closed end in engagement with one of said shoulders.

BERT McCLELLAND.